May 23, 1944.     R. W. POINTER     2,349,373
TRAILER AXLE
Original Filed Feb. 12, 1940     2 Sheets-Sheet 1
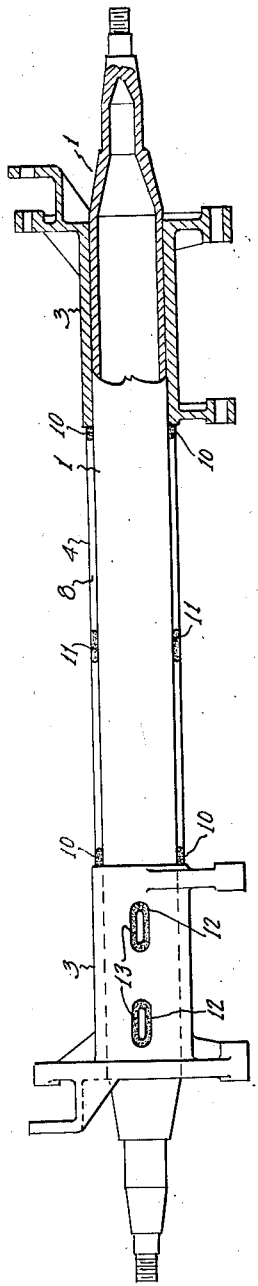
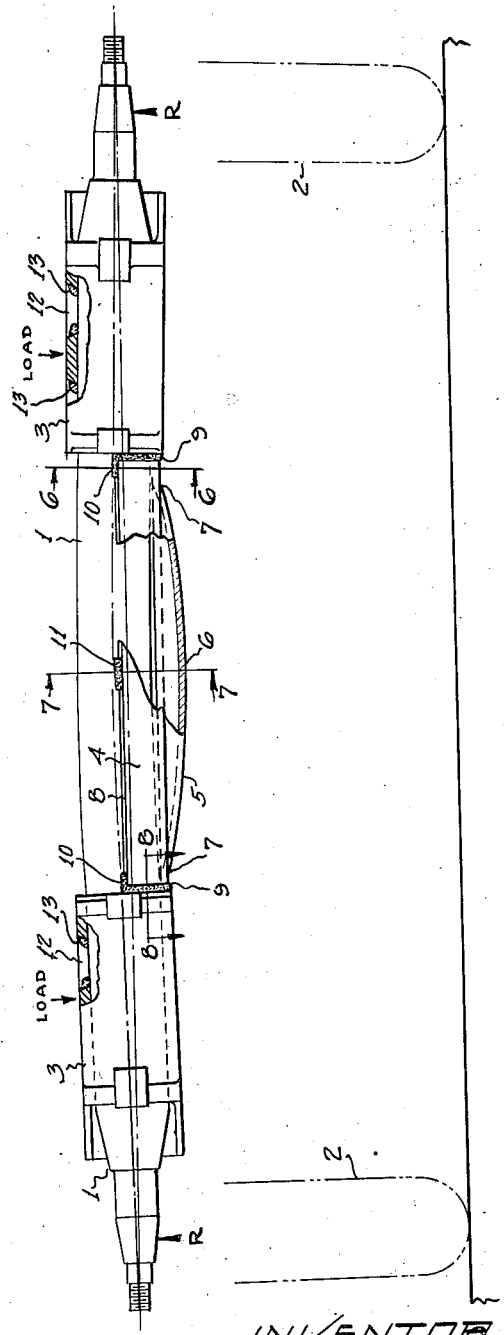
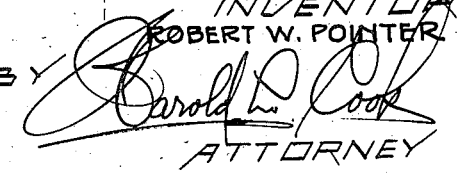

May 23, 1944.   R. W. POINTER   2,349,373
TRAILER AXLE
Original Filed Feb. 12, 1940    2 Sheets-Sheet 2
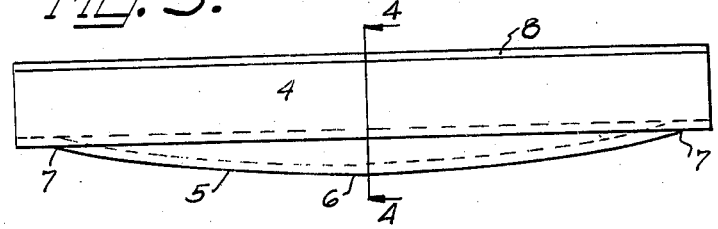
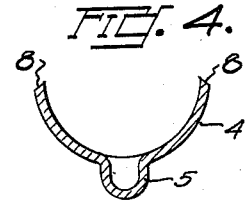
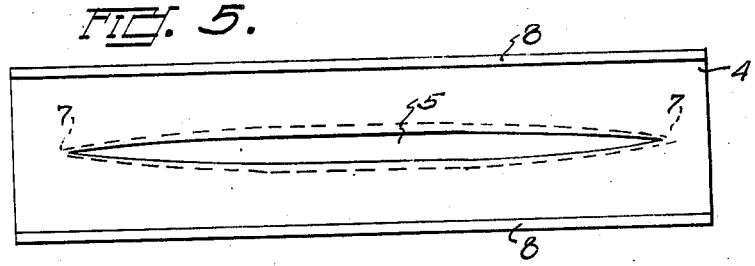
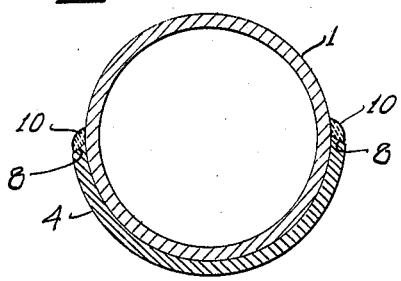
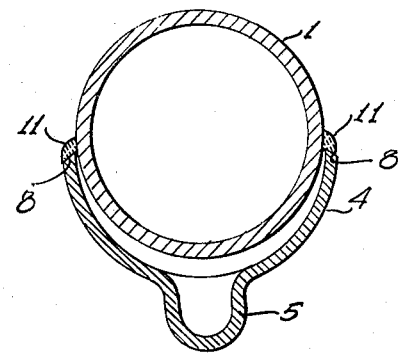
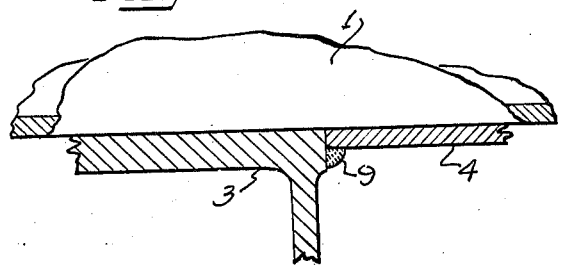
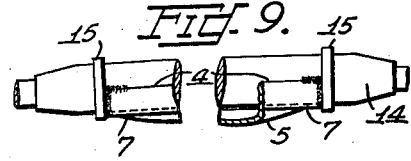
INVENTOR
ROBERT W. POINTER
BY Harold L. Cook
ATTORNEY Patented May 23, 1944

2,349,373

UNITED STATES PATENT OFFICE 2,349,373

TRAILER AXLE

Robert W. Pointer, Portland, Oreg., assignor to Willamette Iron & Steel Corporation, Portland, Oreg., a corporation of Oregon Continuation of application Serial No. 318,478, February 12, 1940. This application December 12, 1941, Serial No. 422,761

6 Claims. (Cl. 301—129)

This invention relates to trussed axles, and has special reference to axles for motor trucks, trailers, and the like.

This application is a continuation of an application, Serial No. 318,478 filed Feb. 12, 1940.

Motor trucks with trailers are being used to an ever increasing extent in the hauling of loads of relatively great weight. It is a common occurrence for trailer units to be overloaded far beyond the capacity that they originally were designed to accommodate. This is particularly true in the logging industry, where specially designed trailer units are used to haul loads of giant fir logs over private roads not subject to weight restrictions. The condition of such private roads used in the logging industry to connect with other modes of transportation is often such as to tax to the utmost the strength and durability of automotive equipment used thereon, even when not overloaded.

Even greater than the stresses imposed upon the moving vehicle carrying a load beyond its capacity are the stresses imposed by the shock of loading and unloading in the manner common in the logging industry. In loading, the logs frequently are dropped bodily onto the trailer unit, creating impact stresses far in excess of any encountered from road conditions. Then, as the load is pyramided up to considerable height, successive logs are dropped on top of the existing load, which may already equal the capacity of the equipment. In unloading, the logs are rolled off one side, starting from the top. This process subjects the vehicle to tremendous shocks, as the uppermost logs are caused to roll down and collide with logs on the bottom layer in the course of their fall.

Trailer axles for such use ordinarily are made with a definite camber, but under conditions of overloading, as above described, the camber is lost and the axle itself bent or buckled under the excessive load so as to be unfit for use. As a consequence, axles of log hauling trailers and equipment are regularly in the shops for repair and straightening, adding considerably to the cost of logging and hauling operations.

Such trailers may have either a single or a double axle, and each axle may carry at each end thereof either single or dual wheels, depending upon the work for which trailer is to be used. Regardless of the type of suspension, excessively heavy loads have a tendency to cause the trailer axle to buckle downwardly between the wheels, thus destroying the original camber and causing the tires to wear unevenly, and, in the case of the trailer having dual wheels at each end of the axle, most of the weight is then carried on the inner pair of tires, resulting in a material shortening of their lives. Great difficulty has been experienced in the past in designing and making an axle that will meet the requirements imposed by overloading and abuse as described above. Axles that have been heat treated to a hardness that will enable them to retain their camber tend to break. Axles not heat treated tend to lose their camber, or to perhaps even buckle, under the load.

The general object of the present invention is to provide an improvement in trussed axles of wheeled vehicles.

A particular object is to provide an improved trussing means for retaining the camber in an axle when loaded in excess of the load designed to be carried by the untrussed axle.

A further object is to provide simple and inexpensive trussing means which may be applied to certain conventional types of axles to prolong the life thereof, and to increase the maximum allowable load which may safely be carried thereby.

These and other objects of the invention will be apparent to one skilled in the art upon reference to the drawings in connection with the following detailed description which forms a part of the specification.

In the drawings:

Figure 1 is a top plan view of an axle having the truss member of the present invention applied thereto.

Figure 2 is a side elevation, with certain parts shown in section, of the axle and truss shown in Figure 1, and indicating the position of the wheels on the axle.

Figure 3 is a side elevation of the truss member forming the subject matter of the present invention.

Figure 4 is a sectional view taken on the line 4—4 of Figure 3.

Figure 5 is a top plan view of the truss shown in Figure 3.

Figure 6 is a section on the line 6—6 of Figure 2.

Figure 7 is a section on the line 7—7 of Figure 2.

Figure 8 is a section with parts broken away, taken on the line 8—8 of Figure 2.

Figure 9 is a fragmentary side elevation of a modified form of structure embodying the invention.

In Figures 1 and 2 there is illustrated one type of load carrying axle, for use with trailer units, having a tubular axle member 1 adapted to carry the road wheels 2, 2. The load to be carried on said axle is, in the present instance, applied to the brake supports 3, 3. In Figure 2 is shown the camber normally applied to such an axle, and the points of application of the several forces and reactions when said axle is considered to be loaded as a beam. Upward reactions are indicated at R, R through each wheel bearing, and the points of load application are indicated by the legend "Load." Figure 1 illustrates an axle having the camber formed therein after machining, but the present invention may also be applied to axles having the camber machined in, as by machining the bearing spindles at the proper angle with respect to the main body of the axle.

When an excessive load is applied in the manner illustrated, it will be apparent that there will be a tendency to remove the camber initially applied to the axle, and, if the load is sufficiently great, or the impact forces sufficiently violent, not only will the camber be removed, but the axle will be buckled downwardly in what may be termed a "negative camber." The truss forming the subject matter of the present invention is designed to greatly increase the resistance of the axle to a deformation out of its original shape while at the same time maintaining the desired ultimate strength and light weight. One form of truss member per se is illustrated in Figures 3, 4 and 5, and comprises a generally semi-cylindrical one piece member or shell 4, carrying a raised bead or rib 5 outwardly directed along its central portion in a direction opposite to the camber in the axle. In the embodiment shown, the rib 5 attains its greatest height in the region of its mid length, indicated at 6, and merges into the cylindrical shape of the shell in the region of the end portions of the rib, as indicated at 7, 7. The upper edges 8—8 on opposite sides of the shell terminate in a common plane and provide a footing for receiving welding material 11 for attachment of the shell 4 to the axle 1 along its neutral axis. The length of the shell 4 is such as to abut both of the brake supports 3, 3 when the shell is applied to the underside of the axle in the manner illustrated in Figure 2. Figure 6 illustrates how the shell is shaped to fit snugly about the lower portion of the axle. Due to the camber in the axle, and the fact that the shell 4 conforms to a portion of the surface of a right circular cylinder, the shell 4 will fit and snugly engage the circumference of the axle only at the end portions of the shell, as shown in Figure 6, the camber of the axle raising its central portion above the bottom of the shell, as shown in the sectional view of Figure 7. The shell 4 is illustrated in the present embodiment as subtending an arc of substantially 180°, but it is not necessary to the attainment of the objects of the present invention to precisely limit the angular extent of the shell as illustrated. The truss or shell 4 in the preferred embodiment is illustrated as being attached, or anchored, at its ends to the brake supports 3, 3 by means of the welds 9, 9 of semicircular shape. If desired, the welds 9 may be continued along the longitudinal edges of the shell 4 for some distance, as indicated at 10, 10. A short weld also is shown at 11 in the mid portion of the longitudinal edges of the shell 4. If desired, the welds 10 and 11 may be extended to unite with each other, thus solidly welding the entire length of each of the beveled edges 8, 8.

Brake supports 3, 3 are illustrated as having openings or apertures 12 in their top sides, in the position applied to the axle in use. These openings 12 provide a location for applying weld metal 13 to rigidly unite the brake supports 3, 3 with the axle 1, it being noted that the welds 13 are thus positioned on the compression side of the neutral axis of the axle 1 so that the welding operation will not reduce the strength of the axle as a beam.

It is to be particularly noted that in the illustrated embodiment no welding on the tension side of the axle, that is, below the level of its neutral axis, is applied to the material of the axle 1 itself. The welds 9, 9 on the lower or tension side of the axle when the latter is loaded as a beam, as indicated in Figure 2, are applied directly and solely to the heavy brake supports 3, 3 to avoid possibility of reducing the strength of the material of the axle itself. By making the shell of semi-cylindrical form, as shown, the welds 10 and 11, which are the only truss welds applied directly to the material of the axle itself, will lie substantially in the plane of the neutral axis where a slight reduction in the strength of the material of the axle will have no deleterious or weakening effect. As shown in Figure 8, the weld material 9 is spaced from the axle by a distance substantially equal to the thickness of the shell 4. If necessary, a sleeve of some good heat conducting material, such as copper, may be inserted between the ends of the shell 4 and the axle 1 to prevent excessive localized heating of the axle during the welding operation.

As best shown in Figure 2, the welding of the shell 4 to the brake supports 3, 3 creates a rigid truss by virtue of the camber of the axle, which truss is further strengthened by the shape of the rib 5. It is found that this construction results in a very stiff axle unit having a strength and stiffness far exceeding that of the same axle untrussed. As a result, the desired camber can be retained under conditions of extreme abuse, and bent or buckled axles which can have their original camber restored can be strengthened by the application of the truss member 4. An important advantage of the truss of the present invention is that it may easily be applied to axles of the type illustrated, both at the time of original assembly of such axle units, and as repair measures whenever such equipment must be repaired. The added strength and stiffness obtained through the use of the present truss is accomplished without the additional weight of material that would of necessity be required by obtaining the same increase in strength through the use of a larger axle which was untrussed. Such a larger axle having the strength of the present trussed axle would consequently be a great deal more expensive, as well as undesirable in use.

It is to be understood that while the brake supports 3, 3 are herein described as forming the means for attachment of the respective ends of the truss 4 in the illustrated embodiment, various other means could be employed to perform the same function. Any rugged sleeve, flange or casting attached near each end of the axle, or any such positioned sleeve, flange or casting which could be made sufficiently rugged, might be utilized to anchor each respective end of the truss member 4. In lieu of using any of the above-mentioned means which may be available for anchoring the ends of the truss 4, lugs or shoulders may be forged, or otherwise formed on the axle 1, and the ends of the truss 4 attached directly thereto. For example, Figure 9 illustrates a construction employing a solid, generally cylindrical, cambered axle 14, the central portion of the axle being broken away. The axle 14 is provided with lugs or shoulders 15, forged or otherwise formed on the axle 14 adjacent its ends. The ends of the truss member 4 are welded directly to the shoulders 15 in the same manner as hereinbefore described in connection with Figures 2 and 8. While welding is disclosed as being the preferred method of attachment, any type of attachment having sufficient strength in tension may be used. If lugs or shoulders were forged on the axle 1 so as to project below the underside of the axle proper, welding could be accomplished directly on such lugs or shoulders without weakening the axle. For the purpose of describing and claiming the present invention, therefore, the brake supports 3, 3 and the shoulders 15—15 may be termed "anchor means," as their function with respect to the truss member 4 is simply to anchor the ends thereof to resist tensional stresses. The term "anchor means" is used in this specification, therefore, to describe any means utilized to anchor the ends of the truss 4, and is not to be construed as being limited to the specific means constituted by the brake supports 3, 3.

It is noted that the axle 1, shown in Figure 1, is illustrated as being a hollow cylindrical shaft. It is not intended to limit the present invention, however, to use with this precise type of axle, as the truss member 4 could obviously be applied with equal advantage to solid and other types of axles.

It is also not intended to limit the present invention to single axles or to use with single wheels, as it is equally capable of application to two-axle trailer units and to axles carrying dual wheels. It will be understood that the invention is described as applied to a load carrying trailer axle only by way of illustration, and that the truss of the present invention may be applied to axles generally, within the scope of the appended claims.

Various other modifications may also be made in the structure illustrated without departing from the spirit of the invention, and it is intended to include all such modifications as fall within the scope of the appended claims.

Having now described my invention and in what manner the same may be used, what I claim as new and desire to protect by Letters Patent is:

1. A trussed axle comprising an axle member having a camber imparted thereto, anchor means near each end of said axle, and a generally semi-cylindrical metal shell having an outwardly directed longitudinal rib and partially enclosing said axle member and attached at its ends to said anchor means, said rib being disposed in a direction opposite to said camber.

2. An axle assemblage comprising an axle member having an anchor member rigidly secured near each end thereof, a generally semi-cylindrical shell partially surrounding said axle member, the end portions of said shell being welded to respective ones of said anchor members, and an outwardly directed raised rib on said shell arranged to cooperate with said axle member to form a structural truss.

3. A cambered axle having an anchor member anchored to said axle near each end thereof, and a generally semi-cylindrical one piece metal truss member partially surrounding said axle on the underside thereof, the length of the truss member being sufficient to abut both said anchor members and having its end portions welded to said anchor members to retain said camber under load, said truss member having an outwardly directed longitudinal rib disposed in a direction opposite to said camber.

4. A trussed axle comprising a generally cylindrical axle having a camber imparted thereto, anchor means anchored to said axle adjacent each end thereof, a generally semi-cylindrical metal shell enclosing the underside of said axle and attached at its ends to said anchor means in trussing relationship therewith to retain said camber under load, and an outwardly directed raised rib on said shell disposed in a direction opposite to said camber.

5. An axle truss adapted to be attached to the underside of an axle, comprising a metal shell of generally semi-cylindrical shape adapted to partially enclose a cambered axle and having a longitudinally disposed outwardly directed raised rib disposed in a direction opposite to the camber in said axle, the mid length portion of said rib being raised to the greatest extent, and the ends of said rib being merged with said cylindrical shape.

6. A trussed axle comprising a generally cylindrical axle having a camber imparted thereto, a substantially straight rigid metal shell of generally U-shaped cross section substantially throughout its length, said shell extending around the under side of said axle, the opposite upper edges of said shell terminating closely adjacent the opposite sides of said axle and being welded thereto substantially along the neutral axis of said axle, the opposite ends of said shell being attached to the opposite end portions of said axle.

ROBERT W. POINTER.

CERTIFICATE OF CORRECTION.

Patent No. 2,349,373. May 23, 1944.

ROBERT W. POINTER.

It is hereby certified that the above numbered patent was erroneously issued to "Willamette Iron & Steel Corporation", as assignee of the entire interest therein, whereas said patent should have been issued to the inventor, said "POINTER" as assignor of one-half interest to Willamette Iron & Steel Corporation, of Portland Oregon, a corporation of Oregon, as shown by the record of assignments in this office; and that the said Letters Patent should be read with this correction therein that the same may conform to the record of the case in the Patent Office.

Signed and sealed this 12th day of September, A. D. 1944.

Leslie Frazer (Seal)                     Acting Commissioner of Patents.